United States Patent [19]

Niino et al.

[11] Patent Number: 4,584,171

[45] Date of Patent: Apr. 22, 1986

[54] METHOD OF PRODUCING ROCKET COMBUSTORS

[75] Inventors: Masayuki Niino, Sendai; Nobuyuki Yatsuyanagi, Shibata; Akinaga Kumakawa, Souma; Akio Suzuki, Shibata; Masaki Sasaki, Shibata; Hiromi Gomi, Shibata; Hiroshi Sakamoto, Shibata; Yoshimichi Masuda, No. 110, 1 Midorigahama 9-chome, Chigasaki-shi, Kanagawa-ken; Ryuzo Watanabe, 15-12 Dainohara 3-chome, Sendai-shi, Miyagi-ken; Junjiro Takekawa, 25-1, Yumino-machi, Sendai-shi, Miyagi-ken; Yoshihiko Doi, Itami; Nobuhito Kuroishi, Itami; Yoshinobu Takeda, Itami; Shigeki Ochi, Itami, all of Japan

[73] Assignees: National Aerospace Laboratories of Science & Technology Agency; Yoshimichi Masuda; Ryuzo Watanabe; Junjiro Takekawa; Sumitomo Electric Industries, all of Japan

[21] Appl. No.: 653,012

[22] Filed: Sep. 21, 1984

[30] Foreign Application Priority Data

Oct. 7, 1983 [JP] Japan .................. 58-188805

[51] Int. Cl.[4] ............................... B22F 7/00

[52] U.S. Cl. ........................... 419/8; 419/5; 419/6; 419/9; 419/38; 419/58; 419/60; 29/157 C; 29/423; 204/25

[58] Field of Search .............. 419/5, 8, 9, 6, 57, 419/58, 38, 60; 29/157 C, 423; 204/25

[56] References Cited

U.S. PATENT DOCUMENTS

| | | | |
|---|---|---|---|
| 3,103,885 | 9/1963 | McLauchlan | 102/49 |
| 3,531,848 | 10/1970 | Gripshover et al. | 29/420.5 |
| 3,549,357 | 12/1970 | Osborne | 75/208 |
| 4,431,449 | 2/1984 | Dillon et al. | 75/246 |
| 4,508,680 | 4/1985 | Niino et al. | 419/8 X |

FOREIGN PATENT DOCUMENTS

| | | |
|---|---|---|
| 1602258 | 11/1970 | France . |
| 4428768 | 11/1969 | Japan . |
| 491416 | 9/1938 | United Kingdom . |
| 149226 | 10/1962 | U.S.S.R. . |

Primary Examiner—Stephen J. Lechert, Jr.
Attorney, Agent, or Firm—Lowe, Price, LeBlanc, Becker & Shur

[57] ABSTRACT

A method of producing rocket combustors wherein in forming an outer cylinder by a powder metallurgical method on the outer side of a cylinder provided on its outer periphery with a cooling wall of channel construction having a plurality of grooves, a low-melting alloy is used as a filler to be filled into the grooves. It is also possible to form the outer cylinder after forming a Cu plating shell on the periphery of the inner cylinder filled with the low-melting alloy.

9 Claims, 9 Drawing Figures

METHOD OF PRODUCING ROCKET COMBUSTORS

BACKGROUND OF THE INVENTION

1. Field of the Invention

This invention relates to a method of producing combustion chambers for liquid propellant rocket engines and particularly it relates to a method of producing combustion chambers of the type having a channel construction for cooling purposes.

2. Description of the Prior Art

In recent years, in liquid propellant rocket engines, there has been a demand for higher thrust, with the result that the cooling and pressure resistance of the combustion chamber have become important problems. In conventional liquid propellant rocket engines, the combustion chamber is provided with a cooling wall of channel construction to satisfy these cooling and pressure resistance requirements. FIGS. 1 and 2 are a schematic perspective view and a cross section, respectively, of a conventional rocket engine chamber. As is clear from FIG. 2, the combustion chamber 1 comprises an inner cylinder 2 made of a high-thermal conductivity material, such as copper or a copper alloy, and an outer cylinder 3 joined to said inner cylinder 2. The periphery of the inner cylinder 2, as is clear from FIG. 2, is formed with a plurality of grooves 4, which constitute a cooling section of channel construction; liquid hydrogen, for example, is passed through these grooves 4 to cool the combustion chamber 1.

In this connection, the combustor 1 described above has heretofore been produced, as shown in FIGS. 3 through 5 depicting fragmentary perspective views, by preparing the inner cylinder 2, machining the outer periphery of the inner cylinder 2 to form the grooves 4, and joining the outer cylinder 3 to the periphery of the inner cylinder 2. However, since the rocket combustor 1 will be subjected to very high pressures, the inner and outer cylinders 2 and 3 must be joined together very strongly. Further, while the cooling of the combustor 1 is a highly important problem, in cases where after the joining of the outer cylinder 3, the grooves 4 develop deformation in their cooling passage cross-sections or the surface condition of the peripheral surfaces of the grooves 4, particularly the surface condition of the region where the outer cylinder 3 is opposed to the grooves 4 is rough, a cooling medium such as liquid hydrogen, when flowing through the grooves, can give rise to excessive frictional loss.

Thus, for joining the inner and outer cylinders 2 and 3 together, there have heretofore been tried various methods such as brazing, electroforming, powder metallurgy, and diffusion bonding. However, in brazing, if the fluidity of the brazing material is poor, there has been a disadvantage that uniform joining strength cannot be obtained. Further, in the case of electroforming, since it is used to form an outer cylinder by Ni-electroplating, there has been a problem that the electrolysis reaction takes a long time. Further, when the diffusion bonding method is used, the bonding accuracy obtained has been found to be poor.

On the other hand, U.S. patent application Ser. No. 686,618 filed Dec. 27, 1984, now abandoned disclose methods of joining inner and outer cylinders by powder metallurgy. According to these prior arts, the production method comprises preparing an inner cylinder provided at its outer periphery with a cooling wall of channel construction having a plurality of grooves, filling the grooves of the inner cylinder with paraffin wax or a mixture of paraffin wax and $Al_2O_3$ powder, and compression molding a metal powder placed around the periphery of the inner cylinder filled with said filler, under isostatic pressure to a predetermined thickness to thereby form an outer cylinder.

However, because of the use of paraffin wax or the like as the filler, there has been a drawback that during the compression molding of the outer cylinder, the paraffin wax is deformed, with the result that the outer cylinder is molded with some of the metal powder particles penetrating into the grooves 4, thus making the cross-sectional shape of the grooves 4 irregular, a fact which greatly increases the frictional loss between the cooling medium and the walls of the grooves 4. In the filling of paraffin wax or the like, if bubbles are present in said wax, the pressure to be applied during cold isostatic pressing (CIP) will cause the paraffin wax to cave in by the amount of said bubbles, with the result that some of the metal particles forming the outer cylinder will project into the grooves 4. Once such projections are formed, mechanical removal thereof is very difficult. Thus it is desirable to detect the presence of such bubbles before CIP is applied, but in the case of using paraffin wax as the filler, such detection of bubbles has been very difficult in practice.

Further, the aforesaid powder metallurgical method has additional drawbacks that the compression molding of the outer cylinder needs also a mold to be placed inside the inner cylinder, that such mold is difficult to produce, and that after compression molding, there is a difference in strength of joining between the outermost periphery of the inner cylinder sintered (the rib-like portions each between adjacent grooves 4) and the sintered portion of the outer cylinder.

SUMMARY OF THE INVENTION

A principal object of this invention is to provide a method of producing rocket combustors of the type in which the outer cylinder is powder metallurgically formed around the inner cylinder, which method eliminates the aforesaid drawbacks, ensures higher strength of joining between the inner and outer cylinders, and produces very little frictional loss when a cooling medium is passed through the channel-like cooling section.

In brief, this invention is a method of producing rocket combustors, comprising the steps of preparing an inner cylinder formed around its outer periphery with a cooling section of channel construction having a plurality of grooves, filling the grooves of said inner cylinder with a low-melting alloy, compression molding a metal powder placed around the inner cylinder filled with said low-melting alloy, to a predetermined thickness to thereby form an outer cylinder, and sintering the same. In this invention, the conventional paraffin wax used as the filler is replaced by a low-melting alloy, e.g., Woods metal. Thus, when a metal powder is compression molded around the inner cylinder filled with a low-melting alloy, there is no possibility of the filler being deformed, nor is the possibility of a change occurring in the cross-sectional shape of the cooling grooves. Further, since the sintered surface portions of the outer cylinder opposed to the grooves are smooth, it is possible to obtain a cooling passage of channel construction having higher cooling efficiency with less frictional loss.

In a particular aspect of the invention, during filling the grooves of the outer periphery of the inner cylinder with a low-melting alloy, the inner cylinder is filled with a low-melting alloy to serve as a core during compression molding of the outer cylinder. The insertion of the core into the inner cylinder concurrently with filling the grooves of the inner cylinder with the filler makes it possible to simplify the production process and the shape of the mold for compression molding subsequent to filling.

However, it is not absolutely necessary to use a low-melting alloy as the core for forming the outer cylinder by compression molding, and, of course, a separately formed metal core may be inserted into the inner cylinder.

In another particular aspect of this invention, subsequently to filling, a Cu plating shell is formed on the periphery of the inner cylinder filled with a low-melting alloy. The formation of such Cu plating shell makes it possible to greatly reduce the frictional loss caused by passage of a cooling medium as described above.

In addition, the metal powder to be used for forming the outer cylinder in the compression molding step may be copper powder, for example. However, copper powder may be replaced by copper powder mixed with Ag or Sn powder or copper powder plated with Ag or Sn, whereby it is possible to further increase the strength of joining between the outer and inner cylinders.

Similarly, to increase the joining strength, the outer periphery of the inner cylinder filled with a low-melting alloy may be plated with Ag or Sn subsequent to the filling of the low-melting alloy.

Further, subsequent to the formation of the Cu plating shell to reduce the frictional loss as described above, the outer periphery of said Cu plating shell may be plated with Ag or Sn. In this case, it is possible to further reduce the frictional loss and to effectively increase the strength of joining between the outer and inner cylinders.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 3 through 5 are fragmentary perspective views illustrating the conventional steps of production of the rocket combustor shown in FIGS. 1 and 2, wherein FIG. 3 shows an inner cylinder, FIG. 4 shows said inner cylinder now formed on its outer periphery with a cooling section of channel construction, and FIG. 5 shows said inner cylinder now having an outer cylinder joined thereto;

FIGS. 6 and 7 are fragmentary sectional views illustrating the steps of implementing a first embodiment of the invention, wherein FIG. 6 shows the formation of a Cu plating layer subsequent to the filling step, and FIG. 7 shows the joining of an outer cylinder; and FIGS. 8 and 9 are views showing a rocket combustor produced through the steps shown in FIGS. 6 and 7, wherein FIG. 8 is a longitudinal half-sectional view and
FIG. 9 is a cross-sectional view.

DESCRIPTION OF THE PREFERRED EMBODIMENTS

First, an inner cylinder of oxygen-free copper formed on its outer peripheral surface with a cooling section of channel construction having a plurality of grooves is prepared by machining. The inner cylinder is then immersed completely in molten Woods metal or the latter is poured into a mold having said inner cylinder placed therein, whereby the periphery and inner side of the inner cylinder are filled with Woods metal. In addition, in order to remove the casting defects such as shrinkage cavities and air bubbles or to improve the run, the inner cylinder may be subjected to gas pressing using a pressure of up to 8 kgf/cm$^2$ after casting, in which contraction and deformation of Woods metal during isostatic pressing can be effectively prevented. When the Woods metal, or the filler, has been solidified, the peripheral excess Woods metal is removed by machining. It is to be noted that when Woods metal is to be poured, a metal core such as of iron or stainless steel may be inserted in the inner side, i.e., hollow portion of the inner cylinder to thereby reduce the required amount of Woods metal to be poured. Alternatively, a metal core of the same shape as the hollow portion of the inner cylinder may be inserted in the inner side of the inner cylinder.

In addition, Woods metal serving as a low-melting alloy used as the filler can be prepared to have a melting start temperature of about 50°–200° C. by suitably adjusting the proportions of its components. The removal of Woods metal is effected by heating it to temperatures in the range of 100°–250° C. However, it is necessary to select an optimum grade of Woods metal by taking into account its hardness and wettability with respect to the copper on the surface of the grooves forming the cooling section of channel construction formed around the periphery of the inner cylinder. While the removal and sintering of Woods metal may be performed continuously in the same oven, it is preferable to perform them separately since Woods metal consists mainly of a low-melting alloy and has a relatively high vapor pressure.

Figure 1:
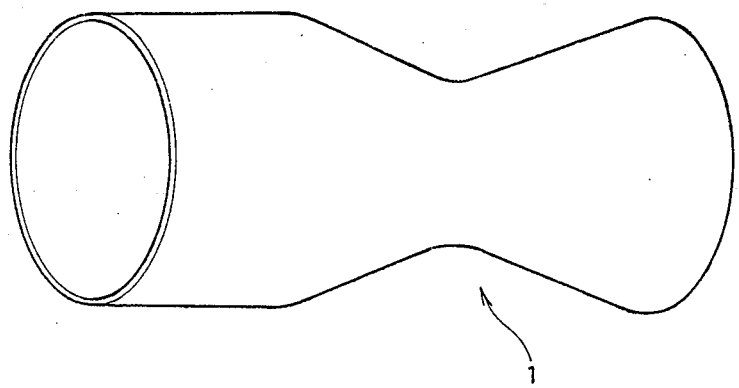
FIG. 1 is a schematic perspective view showing an example of a conventional rocket combustor.
Figure 2:
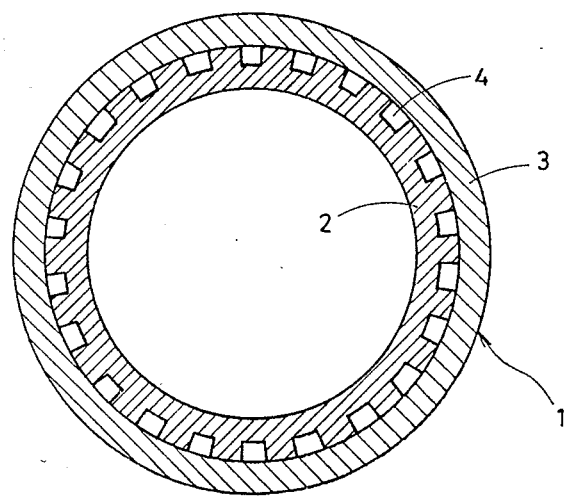
FIG. 2 is a cross-sectional view of the rocket combustor shown in FIG. 1.
Figure 3:
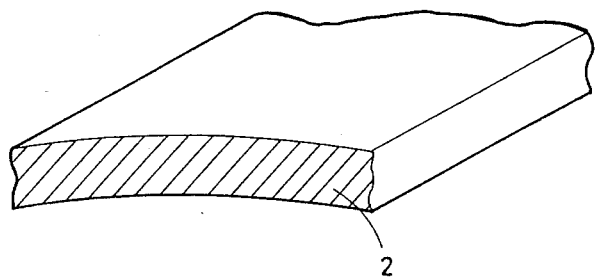
Figure 4:
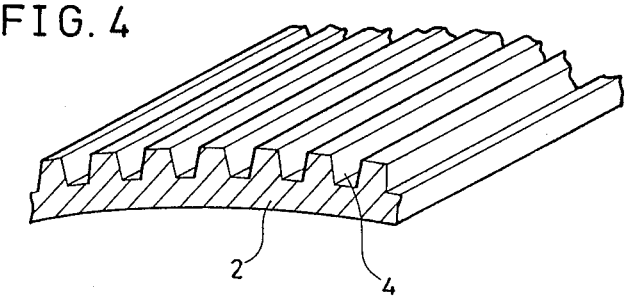
Figure 5:
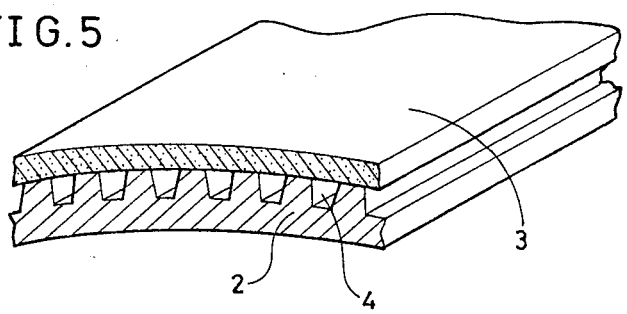
Figure 6:
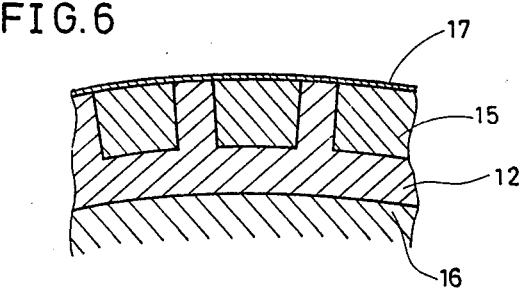

As shown in FIG. 6, the inner cylinder 12 having Woods metal 15 filled into its grooves on the outer periphery and Woods metal 16 filled into its inner hollow portion is formed on its outer periphery with a Cu plating shell 17. As will be later described, in the case of a method using a metal powder as a material for forming the outer cylinder by powder metallurgy, depending upon the cooling condition of the rocket combustor, the particle diameter of the metal powder becomes greater than the thickness of the velocity boundary layer of the cooling medium, leading to a very great frictional loss when the cooling medium is passed. In this embodiment, in order to avoid such frictional loss, the Cu plating shell 17 is formed on the outer periphery of the inner cylinder 12 after the latter has been filled with Woods metal.

The outer surface of the Cu plating shell 17 is subjected to a surface cleaning treatment using sandpaper or an acid, whereby it is formed with a clean and activated surface. This surface treatment is effected to increase the strength of joining to the outer cylinder by sintering to be subsequently effected. In this surface treatment, it is also possible to increase the joining strength after sintering by applying Ag or Sn plating.

Figure 7:
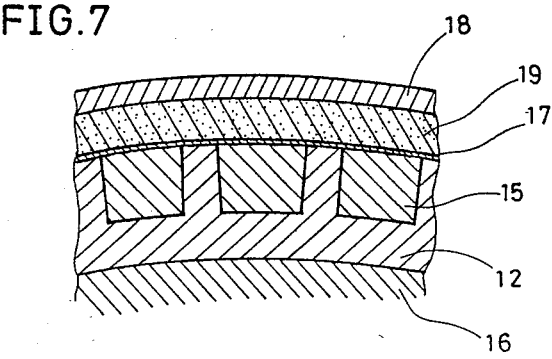

The inner cylinder 12 formed on its outer periphery with the Cu plating shell 17 is then placed in a cylindrical mold 18, as shown in FIG. 7, and copper powder is filled in a space between the mold 18 and the Cu plating layer 17. The copper powder to be used is preferably electrolytic copper powder of −250 mesh superior in compactability and compressibility. If the filling is effected while vibrating the mold 18 or applying a degassing treatment for removing the air from inside the mold 18 by a vacuum device, then filling density can be made higher and uniform and hence the strength and other characteristics after molding and sintering can be improved and the variation of the characteristics reduced.

The powder filler layer 10 (see FIG. 7) is then compression molded by isostatic pressing. The molding pressure is preferably 1 ton/cm$^2$ or above. The molding density varies with the filling method, degassing treatment, and particle size, but it is desirable that the CIP molding density of the CIP compact be above about 70% of the theoretical density. If it is below this figure, the sintering condition for obtaining densities above 90% of the theoretical density becomes limited.

Figure 8:
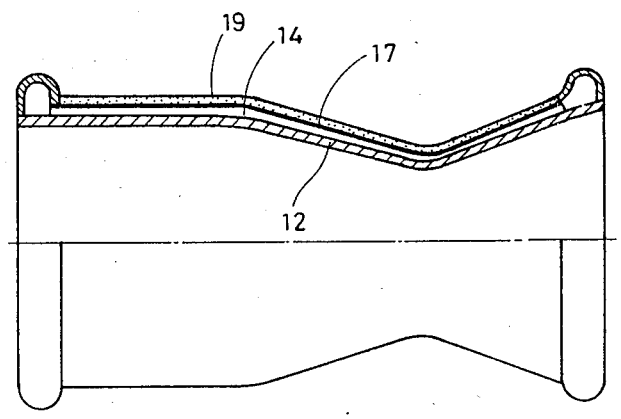
Figure 9:
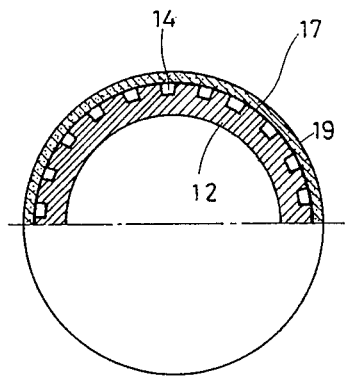

To remove the Woods metal filler from the green compact, the latter is heated to a temperature of 100°–250° C. to melt the Woods metal masses 15 and 16 and the latter are removed from the grooves 14 and inner side of the inner cylinder 12. In this case, it is important that this operation be performed in an atmosphere which does not oxidize the copper in the inner cylinder and in the molded layer 19 forming the outer cylinder, e.g., in an H$_2$ gas atmosphere, in a vacuum, or in an Ar gas atmosphere. Subsequently, a sintering treatment is applied. As for the sintering conditions, generally, the sintering temperature is 850°–950° C., the sintering time is 30 minutes to 2 hours, and the atmosphere is a vacuum, Ar gas, or H$_2$ gas. The construction of the rocket combustor thus obtained is shown in FIGS. 8 and 9.

Although the present invention has been described and illustrated in detail, it is clearly understood that the same is by way of illustration and example only and is not to be taken by way of limitation, the spirit and scope of the present invention being limited only the terms of the appended claims.

What is claimed is:

1. A method of producing rocket combustors comprising the steps of:

preparing a cylinder provided on its outer periphery with a cooling wall of channel construction having a plurality of grooves, filling said grooves of the cylinder with a low-melting alloy, compression molding a metal powder to a predetermined thickness around the periphery of the cylinder filled with said low-melting alloy so as to form an outer cylinder, and sintering the same after said compression molding.

2. A method of producing rocket combustors as set forth in claim 1, wherein in said step of filling the low-melting alloy, a low-melting alloy is simultaneously fill within the cylinder to serve as a core during the compression molding of the outer cylinder.

3. A method of producing rocket combustors as set forth in claim 1, wherein in said step of filling the low-melting alloy, a metal core is simultaneously inserted within the cylinder to serve as a core during the compression molding of the outer cylinder.

4. A method of producing rocket combustors as set forth in claim 1, wherein said step of filling the low-melting alloy into the grooves is followed by forming a Cu plating shell around the periphery of the inner cylinder filled with the low-melting alloy.

5. A method of producing rocket combustors as set forth in claim 1, wherein in said compression molding step, copper powder mixed with slight amounts of Ag and Sn powders is used as the metal powder.

6. A method of producing rocket combustors as set forth in claim 1, wherein in said compression molding step, copper powder plated with Ag or Sn is used as the metal powder.

7. A method of producing rocket combustors as set forth in claim 1, wherein said step of filling the low-melting alloy is followed by the step of plating with Ag or Sn the outer periphery of the cylinder filled with the low-melting alloy.

8. A method of producing rocket combustors as set forth in claim 4, wherein said step of forming the Cu plating shell is followed by the step of plating said Cu plating shell with Ag or Sn.

9. A method of producing rocket combustors as set forth in claim 1, wherein a low-melting alloy having a melting point of about 50°–200° C. is used as said low-melting alloy.

* * * * *